United States Patent
Remis et al.

(10) Patent No.: US 10,324,888 B2
(45) Date of Patent: Jun. 18, 2019

(54) VERIFYING A COMMUNICATION BUS CONNECTION TO A PERIPHERAL DEVICE

(71) Applicant: LENOVO Enterprise Solutions (Singapore) PTE. LTD., New Tech Park (SG)

(72) Inventors: Luke Remis, Raleigh, NC (US); Mark E. Andresen, Cary, NC (US); Wilson Velez, Raleigh, NC (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 233 days.

(21) Appl. No.: 15/272,649

(22) Filed: Sep. 22, 2016

(65) Prior Publication Data

US 2018/0081849 A1    Mar. 22, 2018

(51) Int. Cl.
| | |
|---|---|
| *G06F 13/20* | (2006.01) |
| *G06F 15/173* | (2006.01) |
| *G06F 13/42* | (2006.01) |
| *G06F 13/40* | (2006.01) |
| *G06F 12/06* | (2006.01) |

(52) U.S. Cl.
CPC ...... *G06F 13/4282* (2013.01); *G06F 12/0684* (2013.01); *G06F 13/4022* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 2002/0143976 | A1* | 10/2002 | Barker | H04L 29/06 709/231 |
| 2002/0161867 | A1* | 10/2002 | Cochran | H04L 29/12009 709/221 |
| 2002/0174209 | A1* | 11/2002 | Sesek | H04L 29/06 709/223 |
| 2006/0261940 | A1* | 11/2006 | Defant | B60R 25/2018 340/539.13 |
| 2007/0005738 | A1* | 1/2007 | Alexion-Tiernan | H04L 41/0853 709/223 |
| 2009/0113079 | A1* | 4/2009 | Eren | G01S 5/0289 710/9 |
| 2009/0164579 | A1* | 6/2009 | Chaudhry | H04L 63/08 709/205 |

(Continued)

*Primary Examiner* — Hyun Nam
(74) *Attorney, Agent, or Firm* — Kunzler Bean & Adamson; Bruce R. Needham (57) ABSTRACT

An apparatus, system, method, and program product for verifying a communication bus connection to a peripheral device are disclosed. The apparatus includes a data module that receives, over a communication bus, an identifier for a location where a peripheral device is installed. The peripheral device is communicatively coupled to an information handling device using the communication bus. The apparatus includes a verification module that compares the identifier received over the communication bus to a predefined identifier associated with the communication bus. The apparatus includes a notification module that sends a notification in response to the identifier received over the communication bus not matching the predefined identifier associated with the communication bus.

20 Claims, 7 Drawing Sheets

(56) References Cited

U.S. PATENT DOCUMENTS

| | | | | |
|---|---|---|---|---|
| 2009/0164778 A1* | 6/2009 | Chaudhry | ............... | H04L 63/12 |
| | | | | 713/159 |
| 2010/0225451 A1* | 9/2010 | Gladstone | .............. | G06Q 10/08 |
| | | | | 340/10.5 |
| 2018/0074981 A1* | 3/2018 | Remis | ..................... | G06F 13/22 |
| 2018/0088958 A1* | 3/2018 | Remis | ................... | G06F 9/4401 |

* cited by examiner

VERIFYING A COMMUNICATION BUS CONNECTION TO A PERIPHERAL DEVICE

FIELD

The subject matter disclosed herein relates to peripheral computing devices and more particularly relates to verifying a communication bus connection to a peripheral device.

BACKGROUND

Computing devices may include peripheral devices that are coupled to the computing device using one or more communication buses. The communication buses may be communication bus cables that communicatively couple peripheral devices to an information handling device. In systems with a large number of peripheral devices, however, it may be difficult to manage the communication bus cables connecting the peripheral devices to the information handling device.

BRIEF SUMMARY

An apparatus for verifying a communication bus connection to a peripheral device are disclosed. A method and computer program product also perform the functions of the apparatus. The apparatus includes a data module that receives, over a communication bus, an identifier for a location where a peripheral device is installed. The peripheral device is communicatively coupled to an information handling device using the communication bus.

The apparatus includes a verification module that compares the identifier received over the communication bus to a predefined identifier associated with the communication bus. The apparatus includes a notification module that sends a notification in response to the identifier received over the communication bus not matching the predefined identifier associated with the communication bus.

In one embodiment, the apparatus includes an identifier module that assigns an identifier to each install location for a peripheral device. The identifier may be associated with an intended connection to a communication bus of the information handling device. In some embodiments, the identifier for the install location is predefined based on a peripheral device installation configuration for the information handling device.

In various embodiments, the peripheral device is installed in a drive bay of a backplane, and the identifier includes a bay identifier and an associated slot identifier of the drive bay. In some embodiments, the identifier module writes the identifier for each install location to one or more registers associated with each install location through a storage management processor ("SEP") of the backplane. In a further embodiment, the backplane includes a plurality of install locations for a plurality of peripheral devices. In certain embodiments, each installed peripheral device is communicatively coupleable to the information handling device over separate communication buses.

In one embodiment, the apparatus includes a reference module that dynamically, at system startup, generates a mapping of a received identifier for an install location to a communication bus that the identifier was received on for each installed peripheral device. In a further embodiment, the mapping includes an advanced configuration and power interface ("ACPI") table. In some embodiments, the reference module provides the ACPI table to an operating system of the information handling device.

In various embodiments, the communication bus includes a management bus and the data module reads the identifier over the management bus. In another embodiment, the notification includes an indication that the communication bus is communicatively coupled to an incorrect peripheral device. In some embodiments, the communication bus includes a peripheral component interconnect express ("PCIe") cable. In certain embodiments, the peripheral device includes a non-volatile memory express ("NVMe") storage device.

A method includes receiving, over a communication bus, an identifier for a location where a peripheral device is installed. The peripheral device is communicatively coupled to an information handling device using the communication bus. The method further includes comparing the identifier received over the communication bus to a predefined identifier associated with the communication bus. The method also includes sending a notification in response to the identifier received over the communication bus not matching the predefined identifier associated with the communication bus.

In some embodiments, the method includes assigning an identifier to each install location for a peripheral device, the identifier associated with an intended connection to a communication bus of the information handling device. In various embodiments, the peripheral device is installed in a drive bay of a backplane, and the identifier includes a bay identifier and an associated slot identifier of the drive bay. In further embodiments, the identifier for each install location is written to one or more registers associated with each install location through a storage management processor ("SEP") of the backplane.

In certain embodiments, the backplane includes a plurality of install locations for a plurality of peripheral devices, and each installed peripheral device is communicatively coupleable to the information handling device over separate communication buses. In one embodiment, the method includes dynamically, at system startup, generating a mapping of a received identifier for an install location to a communication bus that the identifier was received on for each installed peripheral device.

In various embodiments, the mapping includes an advanced configuration and power interface ("ACPI") table that is provided to an operating system of the information handling device. In some embodiments, the communication bus includes a management bus and the identifier is read over the management bus. In a further embodiment, the notification includes an indication that the communication bus is communicatively coupled to an incorrect peripheral device.

A program product includes a computer readable storage medium that stores code executable by a processor. The executable code includes code to perform receiving, over a communication bus, an identifier for a location where a peripheral device is installed. The peripheral device is communicatively coupled to an information handling device using the communication bus. The executable code includes code to perform comparing the identifier received over the communication bus to a predefined identifier associated with the communication bus. The executable code includes code to perform sending a notification in response to the identifier received over the communication bus not matching the predefined identifier associated with the communication bus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
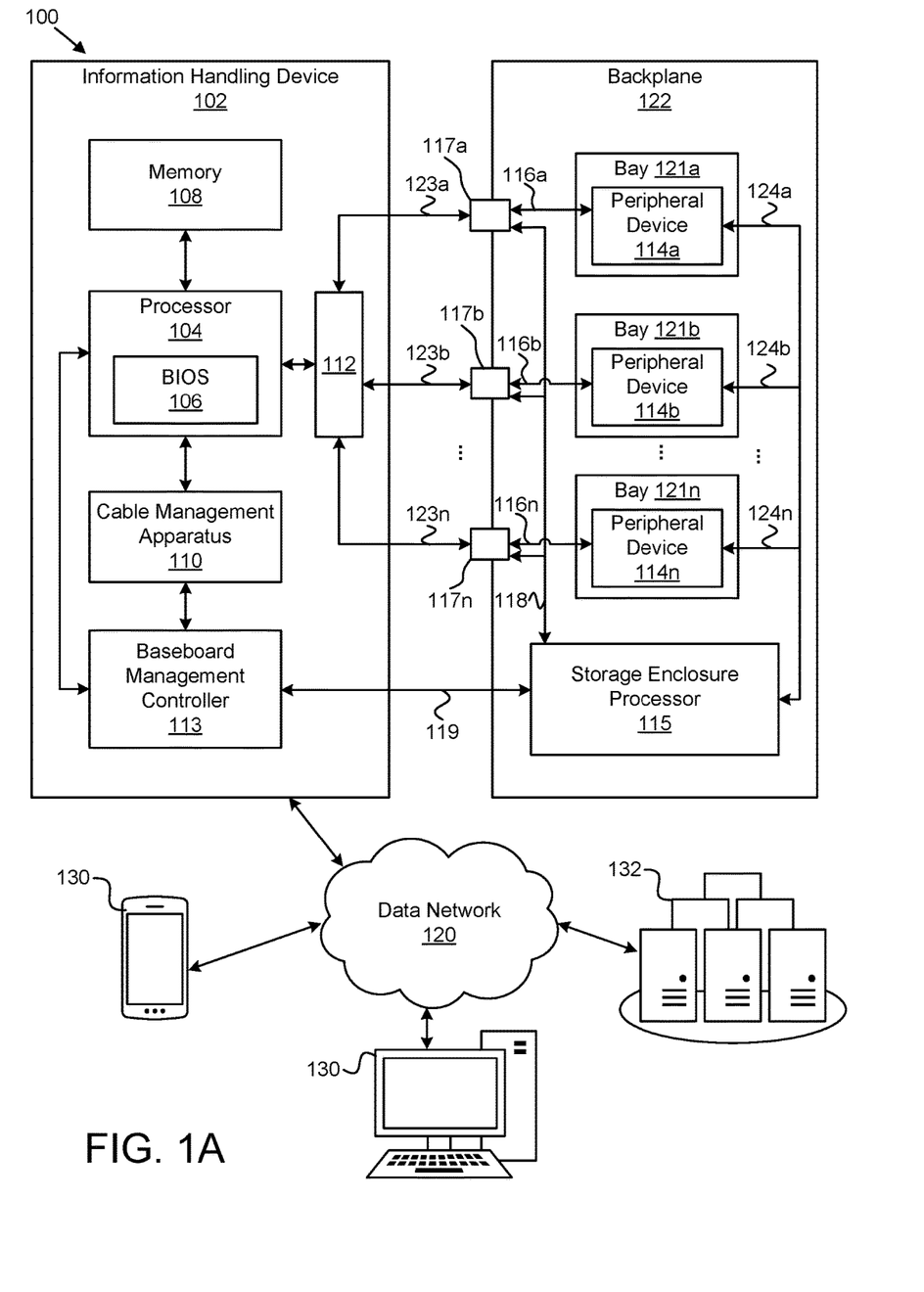
FIG. 1A is a schematic block diagram illustrating one embodiment of a system for verifying a communication bus connection to a peripheral device.

FIG. 1A depicts one embodiment of a system 100 for verifying a communication bus connection to a peripheral device. In one embodiment, the system 100 includes an information handling device 102. The information handling device 102 may include a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a personal digital assistant, or another computing device that includes a processor 104, a volatile memory 108, and/or a non-volatile storage medium, which may be embodied as at least one of the peripheral devices 114a-n.

The processor 104 may include one or more central processing units ("CPUs"), one or more processor cores, a field programmable gate array ("FPGA") or other programmable logic, an application specific integrated circuit ("ASIC"), a controller, a microcontroller, and/or another semiconductor integrated circuit device. The processor 104 may include firmware used to perform hardware initialization during the booting process, such as an instance of a basic input/output system ("BIOS") 106. The BIOS 106, in one embodiment, may include an instance of the Unified Extensible Firmware Interface ("UEFI") firmware.

The system 100, in certain embodiments, includes one or more peripheral devices 114a-n (collectively 114). The peripheral devices 114, as used herein, may include internal and/or external devices that provide input and/or output for the information handling device 102. For example, the peripheral devices 114 may be embodied as storage devices (e.g., non-volatile memory ("NVM") devices, NVM express ("NVMe") devices, solid state storage devices ("SSSD"), and/or the like), flash memory devices, network cards, graphics cards, and/or the like.

In one embodiment, the peripheral devices 114 are connected to the information handling device 102 via a backplane 122. As used herein, a backplane 122 may be embodied as a printed circuit board ("PCB") that includes several slots 117a-n (collectively 117), ports, and/or the like, for connecting multiple peripheral devices 114 or other circuit boards to the backplane 122. For example, the backplane 122 may include a plurality of slots 117, cable connections (e.g., data bus 116 and/or management bus 118 cable connections), and/or other types of connectors for connecting NVMe storage devices to the information handling device 102. As depicted in FIG. 1A, the backplane 122 may be enclosed in a separate device or enclosure, such as a separate storage enclosure, e.g., a storage rack, that is coupled to the information handling device 102 using one or more communication bus cables 123a-n (collectively 123). In some embodiments, the backplane 122 is enclosed within the information handling device 102.

As used herein, a slot 117 on the backplane 122 may be an access point, port, slot, or the like for connecting a communication bus cable 123 from the information handling device 102. The slot 117 may be configured for various types of communication bus cables 123, such as PCIe communication bus cables 123. The slots 117 may be identified, accessed, referenced, or the like using a slot identifier. The slot identifier may be globally unique to a slot 117, unique to a slot 117 on a backplane 122 basis, or the like. The slot identifier may be used, at least in part, to access a peripheral device 114 communicatively connected to the communication bus cable 123 connected to the slot 117.

In some embodiments, the backplane 122 includes drive bays 121a-n (collectively 121) where peripheral devices 114 can be installed, fixed, mounted, and/or the like. For example, a drive bay 121 may be configured for mounting an NVMe storage device to the backplane 122. In some embodiments, each bay 121 is identified with an identifier that may be unique to the backplane 122, globally unique, and/or the like. If the bay identifier is unique to the backplane 122 then, in one embodiment, to access a peripheral device 114 installed in a bay 121, a backplane 122 identifier may also be needed to ensure that the correct peripheral device 114 on the correct backplane 122 is being accessed. In some embodiments, the slot identifier and the bay identifier are used to access a peripheral device 114 that is installed in the bay 121 identified by the bay identifier, and communicatively coupled to the communication bus cable 123 connected to the slot 117 identified by the slot identifier.

In certain embodiments, the peripheral devices 114 are communicatively coupled to the processor 104 using one or more communication bus cables 123. The communication bus cables 123 may include a data bus cable that corresponds to a data bus 116a-n (collectively 116) on the backplane 122, which may be embodied as a cable, as a data line of a PCB of the backplane 122, and/or the like. The data bus cable and the corresponding data bus 116 on the backplane 122 may be used to perform input/output ("I/O") operations (e.g., transmitting data) between the processor 104 and the peripheral devices 114. In certain embodiments, the data bus cable and/or the data bus 116 is a peripheral component interconnect ("PCI") bus, a PCI extended ("PCI-X") bus, an accelerated graphics port ("AGP") bus, a PCI express ("PCIe") bus, a universal serial bus ("USB"), a serial advanced technology attachment ("SATA") bus, and/or the like.

In some embodiments, each peripheral device 114 is coupled to the processor 104 using a separate data bus cable and/or data bus 116. For example, there may be a 1:1 relationship between the peripheral devices 114 and the data bus cables and/or data buses 116 such that each peripheral device 114 is coupled to the information handling device 102 using a separate and independent data bus cable and/or data bus 116.

In one embodiment, the communication bus cable 123 includes a management bus cable that corresponds to a management bus 118 on the backplane 122, which may be embodied as a cable, as a data line of a PCB of the backplane 122, and/or the like. In one embodiment, a management bus 118 is configured to transmit management messages to/from the processor 104 from/to the peripheral devices 114 via a management bus cable. A management bus 118 may be embodied as an Inter-Integrated Circuit ("I²C") communication bus. Management messages may include messages that control a state of the peripheral device 114, such as power on/power off, disable/enable, standby, reset, and/or the like. For example, an operating system running on the information handling device 102 may send a management message over a management bus cable and a management bus 118 to reset a storage device attached to the information handling device 102 over a PCIe cable.

In some embodiments, each management bus cable and/or management bus 118 is communicatively coupled to a single corresponding peripheral device 114. In such an embodiment, there may be a 1:1 relationship between management bus cables and/or management buses 118 and peripheral devices 114 such that each peripheral device 114 is coupled to the information handling device 102 using a separate and independent management bus cable. Referring to FIG. 1A, each management bus connection 124a-n (collectively 124) for the peripheral devices 114 may be associated with a separate and distinct management bus 118 that corresponds to a separate management bus cable. For example, each peripheral device 114 may be coupled to a corresponding management bus cable, instead of using a single management bus cable to manage multiple peripheral devices 114.

In another embodiment, there may be a 1:n or one-to-many relationship between a management bus cable, a management bus 118, and a plurality of peripheral devices 114. In such an embodiment, a management bus 118 may include a plurality of management bus connections 124 that are each connectable to a peripheral device 114 and addressable using an identifier, a unique address (e.g., an address for the management bus connection 124, an address for a peripheral device 114, etc.), and/or the like.

A management bus 118, in one embodiment, is connected to a storage enclosure processor ("SEP") 115 for the backplane 122. As used herein, a SEP 115 may be a processor located on the backplane 122 for managing peripheral devices 114 on the backplane 122. For instance, the SEP 115 may manage the management bus connections 124 for the management bus 118 to transmit management messages between the information handling device 102 and the peripheral devices 114 on the backplane 122, using a management bus cable, based on a unique address for the management bus connection 124 and/or the peripheral device 114.

For example, an operating system for the information handling device 102 may send a reset command to a peripheral device 114 by providing an identifier or address for the peripheral device 114 and/or the management bus connection 124 of the management bus 118. In such an example, the SEP 115 may use the provided identifier or address to send the reset command to the peripheral device 114 associated with the identifier or address. In a further example, the SEP 115 may translate, map, or otherwise cross-reference the provided identifier or address to a different identifier or address used to communicate with the peripheral device 114 on the backplane 122.

As used herein, a management connection between the processor 104, cable management apparatus 110, or the like and a peripheral device 114 is known as a management bus connection 124 whether there is a single management bus cable and/or management bus 118 connected to each peripheral device 114 (e.g., one management bus connection 124 per management bus cable/management bus 118) or a single management bus cable and/or management bus 118 connected to multiple peripheral devices 114 (e.g., multiple addressable management bus connections 124 per management bus cable/management bus 118).

The baseboard management controller ("BMC") 113, in one embodiment, is a specialized hardware component of the information handling device 102 that is used to manage the interface between system management software, such as the BIOS 106, an operating system, or other management software, and platform hardware such as the peripheral devices 114 using a system management bus 119. For example, the BMC 113 may manage the transmission of management messages between the processor, the BIOS 106, the cable management apparatus 110, an operating system, and/or the like, and the peripheral devices 114, the SEP 115, and/or the like.

The bridge or switch 112, in one embodiment, connects the peripheral devices 114 to the processor 104 and/or the cable management apparatus 110 via the communication bus cables 123. The bridge 112 may act as a switch and may direct data and/or management commands between the processor 104 and the respective peripheral devices 114 using the communication bus cables 123 (e.g., a data bus cable, a management bus cable, or a data bus/management bus combination cable). In certain embodiments, a plurality of bridges 112 may be located in the information handling device 102, with each bridge 112 connected to one or more peripheral devices 114 of one or more backplanes 122.

The cable management apparatus 110, in one embodiment, is configured to accurately detect, determine, discover, map, present, and/or the like a communication bus cable configuration and location information for each of the peripheral devices 114 to the BIOS 106, the operating system, an end user, and/or the like. The cable management apparatus 110 is configured to receive, over a communication bus cable 123, an identifier for a location where a peripheral device 114 is installed, compare the identifier received over the communication bus cable 123 to a predefined identifier associated with the communication bus cable 123, and send a notification if the received identifier does not match the predefined identifier for the communication bus cable 123. In some embodiments, at least a portion of the cable management apparatus 110 is located on the processor 104, on the backplane 122, on the BMC 113, on the SEP 115, and/or the like. The cable management apparatus 110 will be described in more detail below with reference to FIGS. 2 and 3.

In one embodiment, the information handling device 102 is connected to a data network 120. The data network 120, in one embodiment, includes a digital communication network that transmits digital communications. The data network 120 may include a wireless network, such as a wireless cellular network, a local wireless network, such as a Wi-Fi network, a Bluetooth® network, a near-field communication ("NFC") network, an ad hoc network, and/or the like. The data network 120 may include a wide area network ("WAN"), a storage area network ("SAN"), a local area network ("LAN"), an optical fiber network, the internet, or other digital communication network. The data network 120 may include two or more networks. The data network 120 may include one or more servers, routers, switches, and/or other networking equipment. The data network 120 may also include one or more computer readable storage media, such as a hard disk drive, an optical drive, non-volatile memory, RAM, or the like.

In one embodiment, the information handling device 102 is connected to one or more other computing devices 130/132 via the data network 120. The other computing devices 130, for example, may include smart phones, tablet computers, laptops, and/or the like. In a further embodiment, the other computing devices 132 may include servers, other devices in a data center located on a local or external data network 120, and/or the like.

Figure 1B:
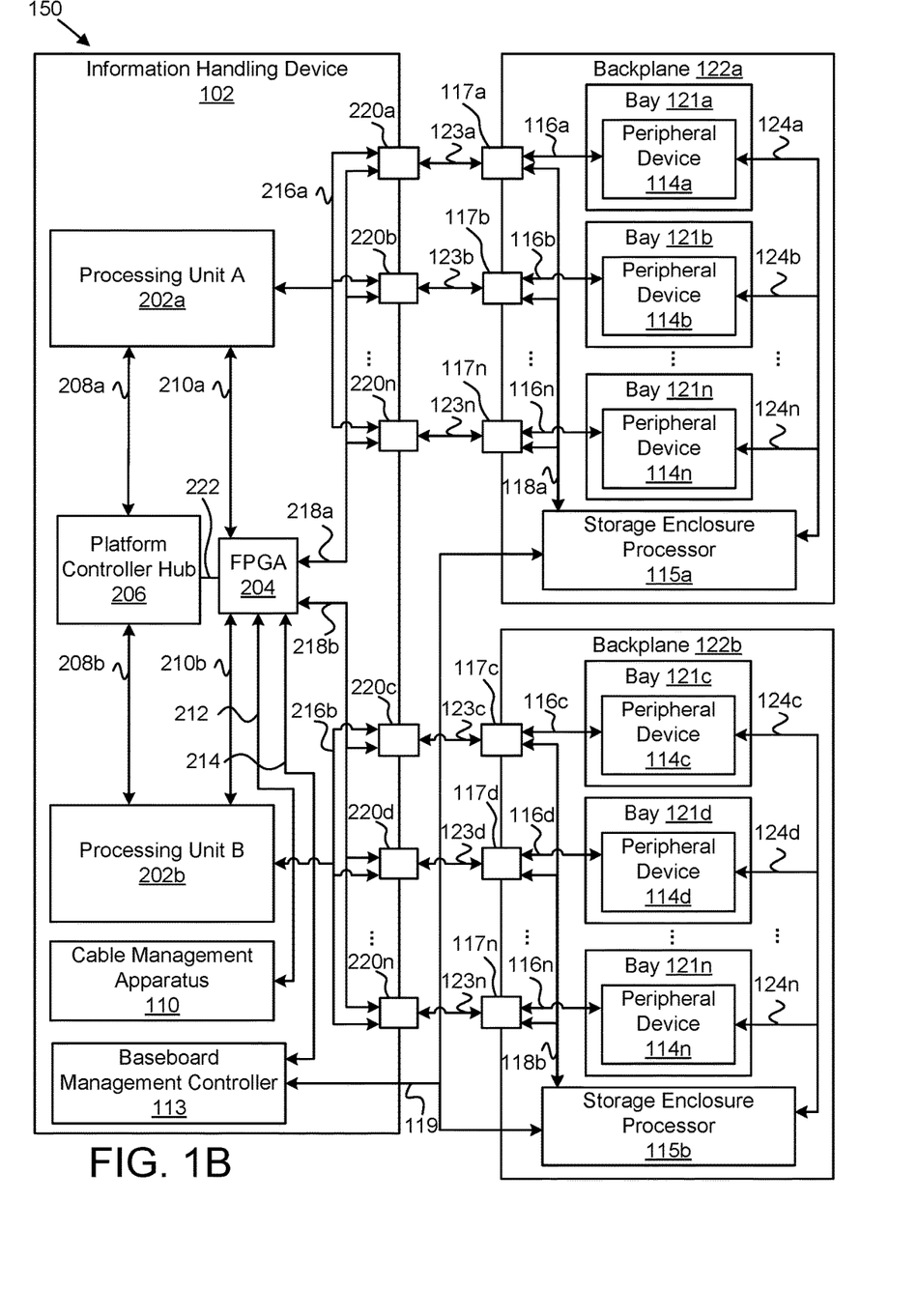
FIG. 1B is a schematic block diagram illustrating one embodiment of another system for verifying a communication bus connection to a peripheral device.

FIG. 1B depicts one embodiment of a "direct attached" system 150 for verifying a communication bus connection to a peripheral device. In one embodiment, the system 150 includes elements that are substantially similar to like elements depicted and described above with reference to FIG. 1A. The system 150 of FIG. 1B, in one embodiment, includes two separate processing units 202a-b (collectively 202) that are each communicatively coupled to peripheral devices 114 on respective backplanes 122a-b (collectively 122). Each processing unit 202 may include one or more processors 104, processor cores, and/or the like, memory elements, storage elements (e.g., registers), and/or the like.

Each processing unit 202 may be communicatively coupled to the peripheral devices 114 on each respective backplane 122 using a communication bus cable 123, described above, and one or more data buses 216a-b (collectively 216) on the information handling device 102, e.g., on the motherboard or other PCB of the information handling device 102, and one or more data buses 116 on the backplanes 122. A processing unit 202 may send various commands, data, instructions, and/or the like to the peripheral devices 114 using the communication buses 123 and/or the data buses 216, 116. For example, a processing unit 202 may send a read request command, a write request command, or the like to an NVMe peripheral storage device located at slot ID 10 and bay ID 62 on the backplane 122.

In a further embodiment, each processing unit 202 is communicatively coupled to a field programmable gate array ("FPGA") 204, or other logic device such as an application-specific integrated circuit ("ASIC"), or the like. In one embodiment, a processing unit 202 is communicatively coupled to the FPGA 204 using an $I^2C$ communication bus, an SHP management bus, and/or some other serial communication bus. The FPGA 204 may be communicatively coupled to a backplane 122, and more particularly a SEP 115 and/or a peripheral device 114 located on a backplane 122, using one or more communication bus cables 123 and/or one or more management buses 218a-b (collectively 218) located on the information handling device 102 and one or more management buses 118 located on the backplanes 122.

The FPGA 204, as used herein, may communicate, transmit, send/receive, and/or the like data, information, commands, etc., between the processing units 202 and/or the cable management apparatus 110 on the information handling device 102, and the SEP 115 and/or the peripheral devices 114 on the backplane 122. For example, the FPGA 204 may communicate with the SEP 115 on a backplane 122, using a particular communication bus cable 123, to determine a slot ID and a bay ID for the peripheral device 114 coupled to the communication bus cable 123. The FPGA 204 may track, store, collect, and/or the like the slot ID and bay ID information associated with each communication bus cable 123 and peripheral device 114 coupled to the communication bus cable 123. In such an embodiment, the FPGA 204 may provide, send, or otherwise make available the slot ID and bay ID information for each peripheral device 114, including the communication bus cables 123 coupled to each peripheral device 114, to an operating system for the information handling device 102, to the BIOS 106, and/or the like. In certain embodiments, the management buses 118, 218 coupled to the FPGA 204 and the SEP 115 include SHP management buses.

In certain embodiments, the information handling device 102, or the motherboard of the information handling device 102, includes one or more slots 220a-n (collectively 220) that are configured to receive a communication bus cable 123 coupled to a corresponding slot 117 on the backplane 122. The slot 220 may be identified using a slot ID, a PCIe lane identifier, and/or the like.

In one embodiment, each processing unit 202 is communicatively coupled to a platform controller hub ("PCH") 206 that is configured to control data paths, like the data buses 216, and manage various functions offloaded from the processing units 202 such as clocking. In some embodiments, the processing units 202 use the PCH 206 to send various data and management commands to the peripheral devices 114 via the FPGA 204. In such an embodiment, the PCH 206 may be coupled to the FPGA 204 using a communication bus 222, which may be embodied as an enhanced serial peripheral interface ("eSPI") bus.

In some embodiments, the cable management apparatus 110 is also coupled to the FPGA 204, over a communication bus 212, to perform the various functions of the cable management apparatus 110 as described in more detail below. Furthermore, the BMC 113 may also be coupled to the FPGA 204, over a communication bus 214, to manage the interface between system management software, such as the BIOS 106, an operating system, or other management software, and the peripheral devices 114, the SEP 115, or the like.

Figure 1C:
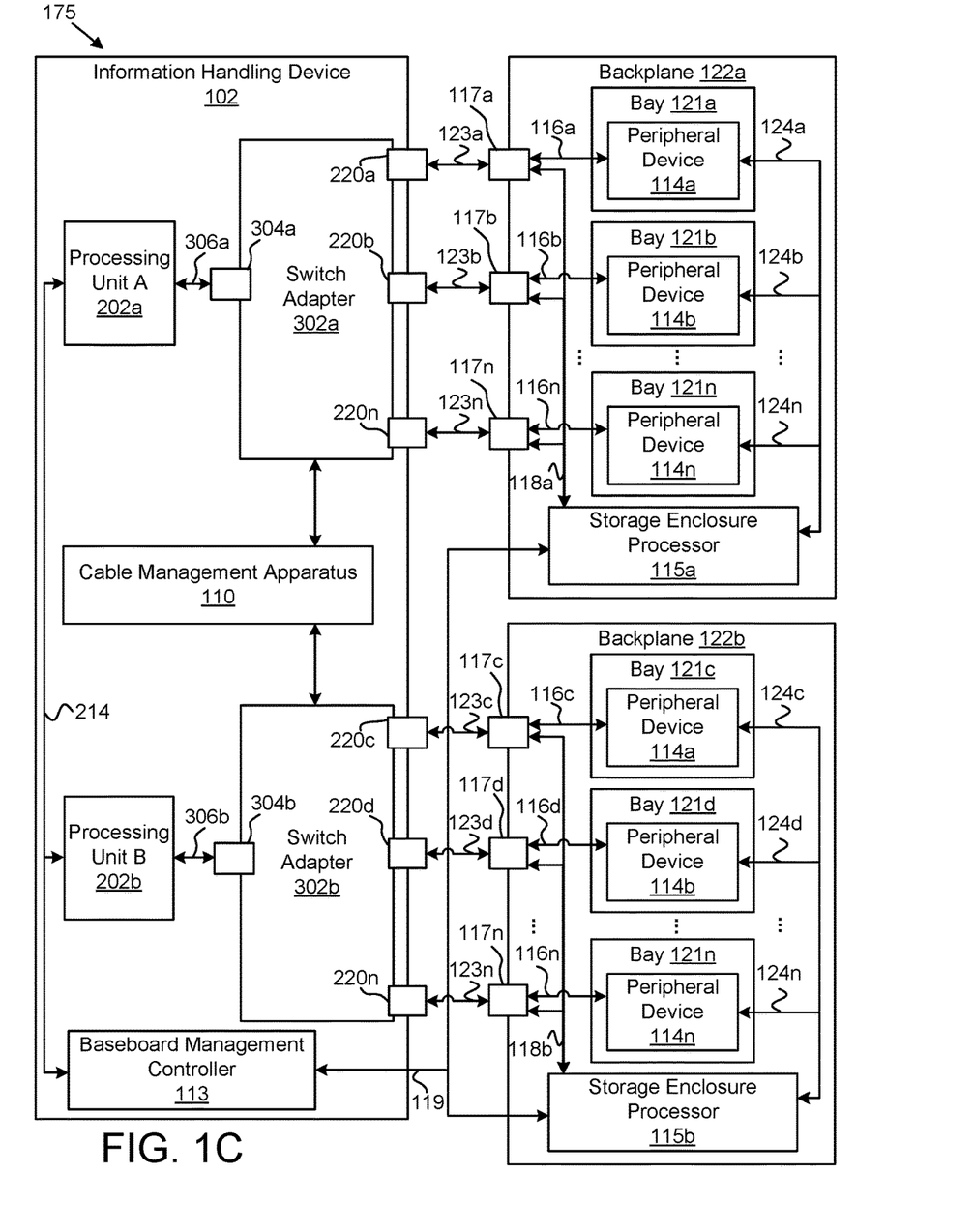
FIG. 1C is a schematic block diagram illustrating one embodiment of another system for verifying a communication bus connection to a peripheral device.

FIG. 1C depicts one embodiment of a "switched" system 175 for verifying a communication bus connection to a peripheral device. In one embodiment, the system 175 includes elements that are substantially similar to like elements depicted and described above with reference to FIGS. 1A and 1B. In one embodiment, the system 175 includes a plurality of switch adapters 302a-b (collectively 302), which may be substantially similar to the switch 112 described above with reference to FIG. 1A.

Each switch adapter 302 may be configured to manage and transmit between each processing unit 202, the cable management apparatus 110, the BMC 113, or the like, and each peripheral device 114 of a backplane 122. For example, a processing unit 202 may provide data or management commands for a particular peripheral device 114 to a coupled switch adapter 302 via a communication bus 306a-b coupled to a communication bus port 304a-b of the switch adapter 302. The switch adapter 302 may forward or transmit the command to a particular peripheral device 114. The peripheral device 114 may be identified using a unique address, a slot ID, a bay ID, and/or the like. Based on the identifier, the switch adapter 302 may determine which communication bus cable 123 is coupled to the identified peripheral device 114.

Figure 2:
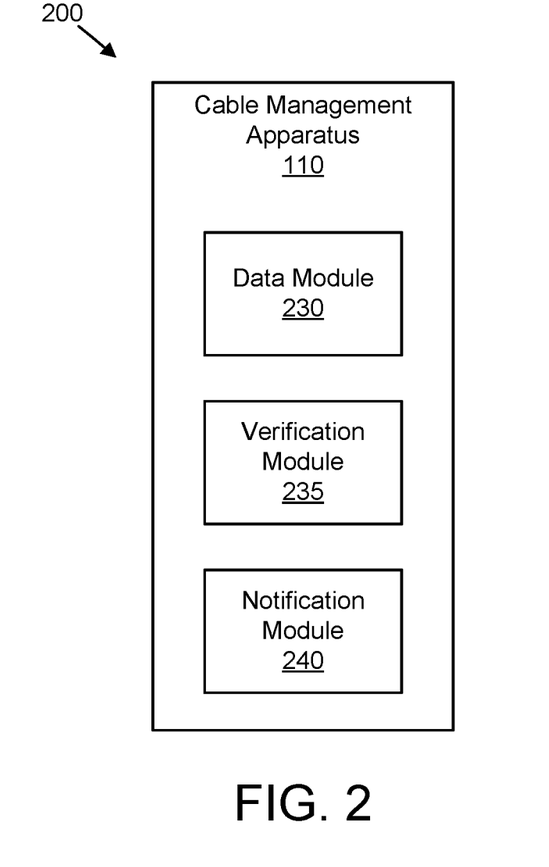
FIG. 2 is a schematic block diagram illustrating one embodiment of an apparatus for verifying a communication bus connection to a peripheral device.

FIG. 2 depicts one embodiment of an apparatus 200 for verifying a communication bus connection to a peripheral device. The apparatus 200 includes an embodiment of a cable management apparatus 110. The cable management apparatus 110 includes a data module 230, a verification module 235, and a notification module 240, which are described in more detail below.

The data module 230 receives, over a communication bus cable 123, an identifier for a location where a peripheral device 114 is installed. The installation location may include a bay 121, a slot 117, and/or the like. The identifier may include a bay ID, a slot ID, a PCIe lane ID, and/or the like. In one embodiment, the FPGA 204 reads data over a communication bus cable 123 coupled to a peripheral device 114 to determine the bay ID and/or the slot ID that identifies the installation location for the peripheral device 114. For example, the FPGA 204 may read a data packet provided by the SEP 115, over an SHP management bus 218, that includes one or more fields containing the bay ID and/or the slot ID for a peripheral device 114.

In one embodiment, the data module 230 iterates over each peripheral device 114 and/or each communication bus cable 123 to determine the installation location identifier, e.g., the bay ID and the slot ID, for each peripheral device 114. For example, the FPGA 204 may read the install location data from each SEP 115 of each backplane 122 for each peripheral device 114 that is identified and coupled to the information handling device 102. Alternatively, the FPGA 204 may iterate over each communication bus cable 123 to receive the installation location data from the SEP 115 for the peripheral device 114 coupled to the information handling device 102 via the communication bus cable 123. In certain embodiments, the data module 230 determines the installation location identifiers for each peripheral device 114 at system startup, e.g., when the information handling device 102 boots up or powers on, when the operating system is loaded, or the like.

The verification module 235 compares the installation location identifier that the data module 230 receives over the communication bus cable 123 to a predefined identifier associated with the communication bus cable 123. In one embodiment, the verification module 235 references, checks, or otherwise looks-up a predefined installation identifier for a communication bus cable 123 that indicates the slot 117 and/or bay 121 on the backplane 122 that the communication bus cable 123 should be connected to. In such an embodiment, the predefined identifier may be determined according to a communication bus cable 123 configuration defined by a manufacturer, a system administrator, and/or the like.

For example, the communication bus cable 123 configuration may indicate that communication bus cable 0 should be connected to slot 0 and bay 0, communication bus cable 1 should be connected to slot 1 and bay 1, and so on. Accordingly, the verification module 235 may compare the slot ID and the bay ID received over each communication bus cable 123 to the predefined installation location identifiers to verify whether the cable topology or cable configuration complies with the predefined communication bus cable 123 configuration. In other words, the verification module 235 determines whether one or more communication bus cables 123 are connected to slots 117 and bays 121 on the backplane 122 that are different than the slots 117 and bays 121 specified by the predefined communication bus cable 123 configuration based on the slot and bay identifiers received over the communication bus cables 123. In certain embodiments, the BMC 113 compares the identifier received over the communication bus cable 123 to the predefined identifier associated with the communication bus cable 123.

The notification module 240 sends a notification in response to the verification module 235 determining that the identifier received over the communication bus cable 123 does not match the predefined identifier associated with the communication bus cable 123. The notification may include a message, a signal, a flag, and/or the like. In one embodiment, the BMC 113 generates the notification and sends, provides, or otherwise makes accessible the notification to the BIOS 106, the operating system for the information handling device 102, an end user, and/or the like.

In some embodiments, the notification may include information regarding the communication bus cables 123 that are incorrectly coupled to the backplane 122, such as an identifier for the communication bus cable 123 (e.g., a PCIe lane identifier), the slot ID, the bay ID, and/or the like. In this manner, the cable management apparatus 110 may warn or notify an end-user if there is an error in the communication bus cable 123 configuration of a system, such as when peripheral devices 114 are added or removed from a backplane 122, which causes communication bus cables 123 to be disconnected and reconnected to the slots 117 on the backplane 122.

Figure 3:
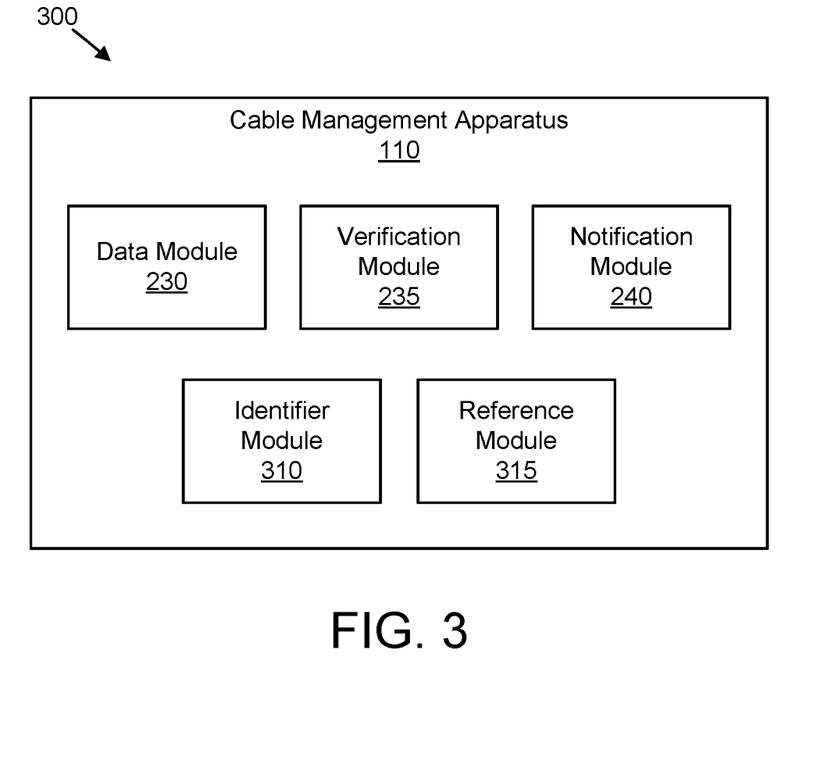
FIG. 3 is a schematic block diagram illustrating one embodiment of another apparatus for verifying a communication bus connection to a peripheral device.

FIG. 3 depicts one embodiment of an apparatus 300 for verifying a communication bus connection to a peripheral device. The apparatus 300 includes another embodiment of a cable management apparatus 110 with a data module 230, a verification module 235, and a notification module 240, which are substantially similar to the data module 230, the verification module 235, and the notification module 240 described above with reference to FIG. 2. In some embodiments, the cable management apparatus 110 includes an identifier module 310 and/or a reference module 315.

The identifier module 310, in one embodiment, assigns an identifier to each install location for a peripheral device 114, e.g., a slot identifier, a bay identifier, a PCIe lane identifier, and/or the like. As described above, every location on a backplane 122 where a peripheral device 114 is installed may be assigned an identifier that uniquely identifies the install location, which may be a globally unique identifier or an identifier unique to a specific backplane 122.

In one embodiment, each identifier for an install location of a peripheral device 114 is predefined based on a predefined or preconfigured peripheral device installation configuration for the information handling device 102, or more particularly for each backplane 122 of the information handling device 102. In such an embodiment, each assigned identifier may be associated with an intended connection to a communication bus cable 123.

For example, a system manufacturer, a system administrator, and/or the like, may define a communication bus cable configuration for the system 100/150/175. Each communication bus cable 123 may be intended to be connected to a specific install location for a peripheral device 114 identified by a slot ID and a bay ID as defined by the communication bus cable configuration. As described above, if the install location identifier for an install location read over a particular communication bus cable 123 does not match the intended install location identifier for the communication bus cable 123, indicating that the communication bus cable 123 is not connected to the preconfigured install location for communication bus cable 123, the notification module 240 may send a notification to indicate that the communication bus cable 123 is not connected to a peripheral device 114 at the preconfigured install location.

In one embodiment, the identifier module 310 writes the installation location identifier for an install location of a peripheral device 114, e.g., the slot ID and bay ID, to a storage location associated with each bay 121 and/or slot 117. In one embodiment, the storage location includes a register, a cache, a non-volatile memory device, a volatile memory device, or the like. For example, each drive bay 121 may have an associated register for storing data associated with the drive bay 121, such as a bay ID and/or a slot ID of the communication bus cable slot 117 for the communication bus cable 123 that should be communicatively coupled to the peripheral device 114 at the install location. The SEP 115 may read the bay ID and/or slot ID from the register when it is requested from the FPGA 204.

In certain embodiments, the identifier module 310 uses the FPGA 204, the SEP 115, and/or the BMC 113 to assign the install location identifiers to each install location, e.g., each register associated with a drive bay 121. For example, the system manufacturer, system administrator, and/or the like may program the SEP 115, the FPGA 204, the BMC 113 and/or another logic device with the install location identifiers for a preconfigured communication bus cable configuration. In one embodiment, the BMC 113 programs the SEP 115 with the predefined install location identifiers. The identifier module 310 may read the install location identifiers from the SEP 115, the FPGA 204, the BMC 113, or the like, and write the received install location identifiers to the registers, or other storage location, associated with each install location on the backplanes 122.

The reference module 315, in one embodiment, generates a mapping of a received identifier for an install location to a communication bus cable 123, or an identifier for a communication bus cable 123, that the identifier was received over for each installed peripheral device 114. In some embodiments, the reference module 315 generates the mapping at system startup, e.g., when the information handling device 102 powers on, when an operating system for the information handling device 012 boots-up, or the like. For example, at system startup, the reference module 315 may determine each communication bus cable 123 that is coupled to a peripheral device 114 installed on each backplane 122 coupled to the information handling device 102. The identifier module 310, for instance, may query the BIOS 106, the BMC 113, the FPGA 204, and/or the like, which may have previously executed a system check, to determine which peripheral devices 114 are present.

In one embodiment, as the data module 230 receives an identifier, over a communication bus cable 123, for an install location of a peripheral device 114, the reference module 315 creates a mapping of the received identifier (e.g., slot ID and/or bay ID) to the communication bus cable 123 that the data module 230 received the identifier over. The reference module 315, in one embodiment, creates a mapping of an identifier for an install location to a communication bus cable 123 for each communication bus cable 123 that is communicatively coupled to a peripheral device 114. Accordingly, the reference module 315 creates a mapping table that includes each install location identifier-communication bus cable 123 mapping.

The verification module 235 may compare each install location identifier for each communication bus cable 123 in the mapping table to a predefined install location identifier for each communication bus cable 123. If a received identifier in the mapping table for a particular install location identifier-communication bus cable 123 mapping is different than the predefined install location identifier for the communication bus cable 123 of the mapping, then the notification module 240 may send a notification to indicate that the communication bus cable 123 may be coupled to the incorrect or not recommended install location for a peripheral device 114.

In one embodiment, the reference module 315, via the FPGA 204, provides the mapping table to the BIOS 106, the operating system for the information handling device 102, the BMC 113, and/or the like. In some embodiments, the reference module 315 stores the mapping table in a storage location accessible to the BIOS 106 and/or the operating system. In one embodiment, the mapping table is embodied as an advanced configuration and power interface ("ACPI") table. As used herein, ACPI is a type of interface that enables an operating system to directly configure and manage hardware components. Accordingly, the operating system may use the ACPI mapping table to determine and configure a communication bus cable configuration and manage peripheral devices 114 coupled to the information handling device 102. In a further embodiment, the BIOS 106 may use the ACPI table to program, assign, or otherwise associate a PCIe port on the information handling device 102 (e.g., on the motherboard) and/or on the backplane 122 with the received identifier, e.g., the slot ID for a slot 117.

Figure 4:
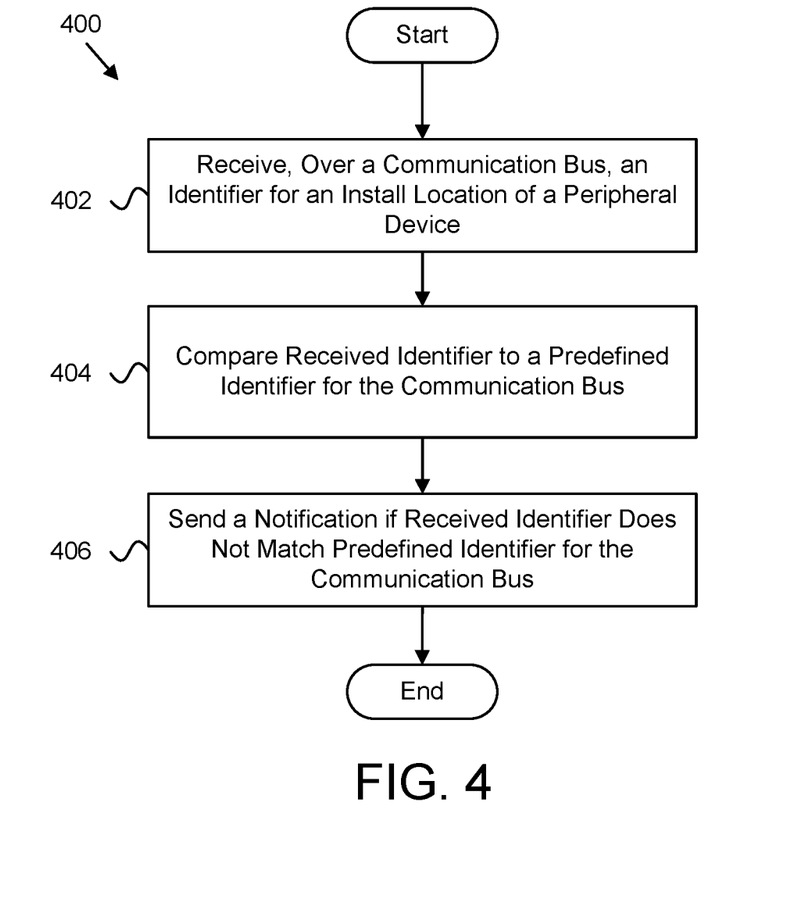
FIG. 4 is a schematic flow chart diagram illustrating one embodiment of a method for verifying a communication bus connection to a peripheral device.

FIG. 4 depicts one embodiment of a method 400 for verifying a communication bus connection to a peripheral device. The method 400 begins and receives 402, over a communication bus cable 123, an identifier for a location where a peripheral device 114 is installed. The peripheral device 114, as described above, is communicatively coupled to an information handling device 102 using the communication bus cable 123.

The method 400 further compares 404 the identifier received over the communication bus cable 123 to a predefined identifier associated with the communication bus cable 123. The method 400 also sends 406 a notification in response to the identifier received over the communication bus cable 123 not matching the predefined identifier associated with the communication bus cable 123, and the method 400 ends. In certain embodiments, the data module 230, the verification module 235, and the notification module 240 perform the various steps of the method 400. In further embodiments, the FPGA 204, the BMC 113, the SEP 115, one or more processing units 202, and/or the like perform, or are used to perform, the various steps of the method 400.

Figure 5:
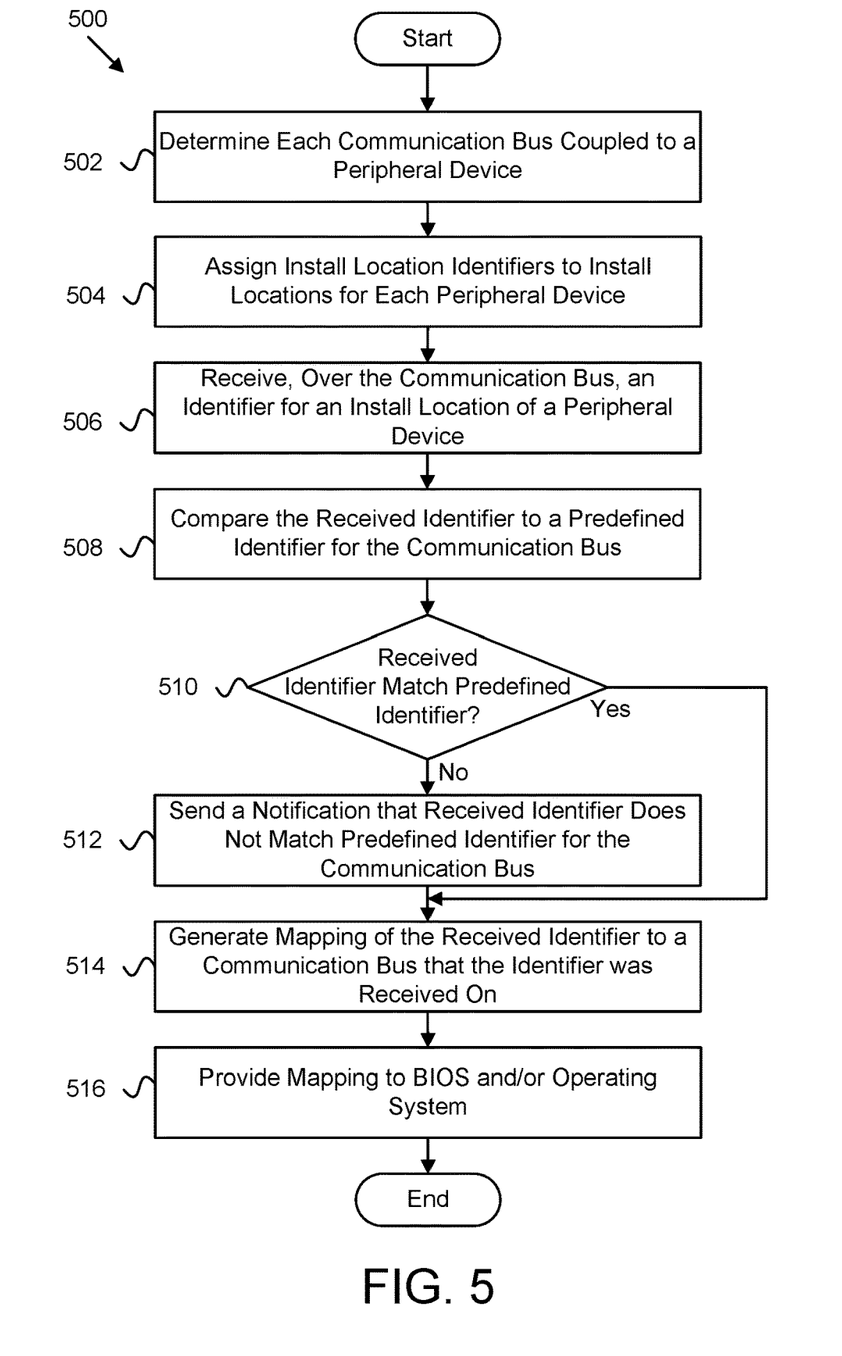
FIG. 5 is a schematic flow chart diagram illustrating one embodiment of another method for verifying a communication bus connection to a peripheral device.

FIG. 5 depicts one embodiment of a method 500 for verifying a communication bus connection to a peripheral device. In one embodiment, the method 500 begins and determines 502 each communication bus cable 123 that is coupled to a peripheral device 114. The method 500, in a further embodiment, assigns 504 an identifier to each install location for a peripheral device 114. In some embodiments, the identifier is associated with an intended connection to a communication bus cable 123. The identifier may include a slot ID for a slot 117 that the communication bus cable 123 is coupled to, a bay ID for a drive bay 121 where the peripheral device 114 is located, and/or the like.

The method 500 receives 506, over a communication bus cable 123, an identifier for a location where a peripheral device 114 is installed. The method 500 compares 508 the identifier received over the communication bus cable 123 to a predefined identifier associated with the communication bus cable 123. The method 500 determines 510 whether the identifier that is received over the communication bus cable 123 matches the predefined identifier for the communication bus cable 123. If not, the method 500 sends 512 a notification that indicates that the communication bus cable 123 is communicatively coupled to an incorrect, erroneous, or not recommended peripheral device 114.

The method 500, in one embodiment, generates 514 a mapping of the received identifier for an install location of a peripheral device 114 to a communication bus cable 123 that the identifier was received on for each installed peripheral device 114. In some embodiments, the method 500 generates 514 the mapping at system startup, e.g., when the information handling device 102 is powered on or boots. In a further embodiment, the method 500 provides 516 the received identifier-to-communication bus cable 123 mapping for each peripheral device 114 coupled to the information handling device 102 to the BIOS 106, the operating system for the information handling device 102, and/or the like, and the method 500 ends.

In some embodiments, the data module 230, the verification module 235, the notification module 240, the identifier module 310, and/or the reference module 315 perform the various steps of the method 500. In a further embodiment, the FPGA 204, the BMC 113, the SEP 115, one or more processing units 202, and/or the like perform, or are used to perform, the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a data module that receives, over a communication bus cable, an identifier for a location of a slot of a backplane where a peripheral device is installed, the peripheral device communicatively and directly coupled to an information handling device using the communication bus cable;
a verification module that compares the identifier received over the communication bus cable to a predefined location identifier assigned to the communication bus cable according to a predefined cable configuration for the backplane; and
a notification module that sends a notification in response to the identifier received over the communication bus cable not matching the predefined identifier assigned to the communication bus cable.

2. The apparatus of claim 1, further comprising an identifier module that assigns an identifier to each install location for a peripheral device, the identifier corresponding to an intended connection to a communication bus of the information handling device.

3. The apparatus of claim 2, wherein the identifier for the install location is predefined based on a peripheral device installation configuration for the information handling device.

4. The apparatus of claim 2, wherein the peripheral device is installed in a drive bay of a backplane, and the identifier comprises a bay identifier and a corresponding slot identifier of the drive bay, and wherein the identifier module writes the identifier for each install location to one or more registers corresponding to each install location through a storage management processor ("SEP") of the backplane.

5. The apparatus of claim 4, wherein the backplane comprises a plurality of install locations for a plurality of peripheral devices, each installed peripheral device communicatively coupleable to the information handling device over separate communication buses.

6. The apparatus of claim 1, further comprising a reference module that dynamically, at system startup, generates a mapping of a received identifier for an install location to a communication bus that the identifier was received on for each installed peripheral device.

7. The apparatus of claim 6, wherein the mapping comprises an advanced configuration and power interface ("ACPI") table, and wherein the reference module provides the ACPI table to an operating system of the information handling device.

8. The apparatus of claim 1, wherein the communication bus cable comprises a management bus cable and the data module reads the identifier over the management bus cable.

9. The apparatus of claim 1, wherein the notification comprises an indication that the communication bus cable is communicatively coupled to an incorrect peripheral device.

10. The apparatus of claim 1, wherein the communication bus cable comprises a peripheral component interconnect express ("PCIe") cable.

11. The apparatus of claim 1, wherein the peripheral device comprises a non-volatile memory express ("NVMe") storage device.

12. A method comprising:
receiving, over a communication bus cable, an identifier for a location of a slot of a backplane where a peripheral device is installed, the peripheral device communicatively and directly coupled to an information handling device using the communication bus cable;
comparing the identifier received over the communication bus cable to a predefined location identifier assigned to the communication bus cable according to a predefined cable configuration for the backplane; and
sending a notification in response to the identifier received over the communication bus cable not matching the predefined identifier assigned to the communication bus cable.

13. The method of claim 12, further comprising assigning an identifier to each install location for a peripheral device, the identifier corresponding to an intended connection to a communication bus of the information handling device.

14. The method of claim 13, wherein the peripheral device is installed in a drive bay of a backplane, and the identifier comprises a bay identifier and a corresponding slot identifier of the drive bay, and wherein the identifier module writes the identifier for each install location to one or more registers corresponding to each install location through a storage management processor ("SEP") of the backplane.

15. The method of claim 14, wherein the backplane comprises a plurality of install locations for a plurality of peripheral devices, each installed peripheral device communicatively coupleable to the information handling device over separate communication buses.

16. The method of claim 12, further comprising dynamically, at system startup, generating a mapping of a received identifier for an install location to a communication bus that the identifier was received on for each installed peripheral device.

17. The method of claim 16, wherein the mapping comprises an advanced configuration and power interface ("ACPI") table, and wherein the ACPI table is provided to an operating system of the information handling device.

18. The method of claim 12, wherein the communication bus cable comprises a management bus cable and the identifier is read over the management bus cable.

19. The method of claim 12, wherein the notification comprises an indication that the communication bus cable is communicatively coupled to an incorrect peripheral device.

20. A program product comprising a non-transitory computer readable storage medium that stores code executable by a processor, the executable code comprising code to perform:
receiving, over a communication bus cable, an identifier for a location of a slot of a backplane where a peripheral device is installed, the peripheral device communicatively and directly coupled to an information handling device using the communication bus cable;
comparing the identifier received over the communication bus cable to a predefined location identifier assigned to the communication bus cable according to a predefined cable configuration for the backplane; and
sending a notification in response to the identifier received over the communication bus cable not matching the predefined identifier assigned to the communication bus cable.

* * * * *